United States Patent [19]
Wood

[11] Patent Number: 5,139,978
[45] Date of Patent: Aug. 18, 1992

[54] IMPREGNATION METHOD FOR TRANSFORMATION OF TRANSITION ALUMINA TO A ALPHA ALUMINA

[75] Inventor: Thomas E. Wood, St. Paul, Minn.

[73] Assignee: Minnesota Mining and Manufacturing Company, St. Paul, Minn.

[21] Appl. No.: 552,891

[22] Filed: Jul. 16, 1990

[51] Int. Cl.$^5$ .............................. C04B 35/10
[52] U.S. Cl. ..................... 501/127; 501/153
[58] Field of Search .................. 501/127, 153

[56] References Cited

U.S. PATENT DOCUMENTS

| | | | |
|---|---|---|---|
| B 502,773 | 1/1976 | Sowman | 106/57 |
| 3,108,888 | 10/1963 | Bugosh | 106/62 |
| 3,491,491 | 1/1970 | Ueltz | 51/309 |
| 3,491,492 | 1/1970 | Ueltz | 51/309 |
| 3,615,308 | 10/1971 | Amero | 51/309 |
| 3,717,497 | 2/1973 | Stradley et al. | 117/169 |
| 3,734,767 | 5/1973 | Church et al. | 501/127 |
| 3,808,015 | 4/1974 | Seufert | 106/65 |
| 3,853,688 | 12/1974 | d'Ambrosio | 161/178 |
| 4,007,020 | 2/1977 | Church et al. | 51/295 |
| 4,019,914 | 4/1977 | Esper et al. | 106/62 |
| 4,101,615 | 7/1978 | Horikiri et al. | 264/63 |
| 4,125,406 | 11/1978 | Sowman | 106/57 |
| 4,217,113 | 8/1980 | Suh | 51/309 |
| 4,224,099 | 9/1980 | McGill | 156/620.5 |
| 4,252,544 | 12/1981 | Takahashi | 51/309 |
| 4,574,003 | 3/1986 | Gerk | 51/309 |
| 4,615,875 | 10/1986 | Gonczy et al. | 423/626 |
| 4,623,364 | 11/1986 | Cottringer et al. | 51/309 |
| 4,657,754 | 4/1987 | Bauer et al. | 423/625 |
| 4,744,802 | 5/1988 | Schwabel | 51/309 |
| 4,770,671 | 9/1988 | Monroe et al. | 51/293 |
| 4,797,139 | 1/1989 | Bauer | 51/293 |
| 4,829,031 | 5/1989 | Roy et al. | 501/134 |
| 4,881,951 | 11/1989 | Wood et al. | 51/293 |
| 4,960,441 | 10/1990 | Pellow et al. | 51/293 |
| 4,964,883 | 10/1990 | Morris et al. | |
| 5,009,676 | 4/1991 | Rue et al. | 51/293 |
| 5,011,508 | 4/1991 | Wald et al. | 51/293 |

FOREIGN PATENT DOCUMENTS

| | | | |
|---|---|---|---|
| 0293163 | 11/1980 | European Pat. Off. | 35/10 |
| 0291029 | 11/1988 | European Pat. Off. | 35/10 |
| 0294208 | 12/1988 | European Pat. Off. | 35/10 |
| WO90/02160 | 3/1990 | PCT Int'l Appl. | 3/14 |
| 2099012 | 5/1982 | United Kingdom | . |
| 2094288 | 9/1982 | United Kingdom | 35/10 |

OTHER PUBLICATIONS

E. Ryshkewitch, *Oxide Ceramic*, Academic Press, New York, 1960, pp. 193-195.

"Nucleation and Epitaxial Growth in Diphasis (Crystalline & Amorphous) Gels", Roy et al., publication information unknown.

"A Novel Combustion Process for the Synthesis of Fine Particle α-Alumina and Related Oxide Materials", Mat. Lett., 6 (11,12), Jul. 1988, pp. 427-432.

"Enhanced Densification of Boehmite Sol-Gels by Alpha Alumina Seeding", Kumagai et al.,*Communications of the American Ceramic Society*, Nov., 1984, C-230-31.

"Microstructural Evolution in Sintering of ALOOH Gels", Yarbrough et al., *J. Mater. Res.*, 3, (4), 1987, pp. 494-515.

"Enhancing densification of 93% $Al_2O_3$-7% MgO triphasic xerogels with crystalline $\alpha$-$Al_2O_3$ and $MgAl_2O_4$ seeds", Komarneni et al., J. Mater. Sci. Lett., 6, 1987, pp. 525-527.

"Sapphire Whiskers from Boehmite Gel Seeded with α-Alumina", Jagota et al., *J. Cryst. Growth*, 85, 1987, pp. 527-534.

"Ceramics by the Solution-Sol-Gel Route", Roy, *Science*, 238, Dec. 18, 1987, pp. 1664-1669.

"Solid-Phase Epitaxy of Boehmite-Derived α-Alumina on Hematite Seed Crystals", McArdle et al., *J. Am. Ceramic Soc.*, 72, (5), 1989, pp. 864-867.

"Nucleation of Alpha Alumina in Boehmite Gel", Pach et al., *J. Mater. Res.*, 5, (2), Feb. 2, 1990, pp. 278-285.

"Effects of Metallic Oxides on α-Transformation of Alumina", Wakao et al., *Nagoya Kogyo Gijutsu Shikeusho Hokoko* II, 11, (9), Sep., 1962, pp. 588-595.

"Influence of Cr and Fe on Formation of $\alpha$-$Al_2O_3$ from $\gamma$-$Al_2O_3$", *J. Am. Ceram. Soc.*, 57, (8), 1974, pp. 367-371, (Bye et al.).

"The Effect of $Cr^{3+}$ and $Fe^{3+}$ Ions on the Transformation of Different Aluminum Hydroxides to $\alpha$-$Al_2O_3$", Tsuchida et al., *Thermochim. Acta.*, 64, 1983, pp. 337-353.

"Transformation and Microstructure Control in Boehmite-derived Alumina by Ferric Oxide Seeding", *Adv. Cer. Matls.*, 3, (4), 1988, pp. 387-392 (McArdle et al.).

"Alpha Alumina Formation in $Al_2O_3$ Gels", Dynys et al., *Ultrastructure Processing of Ceramics, Glasses, and Composites*, Ch. 11, Hench et al., ed., 1984.

"Lowering the Sintering Temperature and Enhancing Densification by Epitaxy in Structurally Diphasic $Al_2O_3$-MgO Xerogels", Suwa et al., *Matl. Sci. Eng.*, 83, 1986, pp. 151-159.

"Controlled Transformation and Sintering of a Boehmite Sol-Gel by α-Alumina Seeding", Kumagai et al., *J. Am. Ceram. Soc.*, 68, (9), 1985, pp. 500-505.

"Low-Temperature Sintering of Aluminum Oxide", Yeh et al., *J. Am. Ceram. Soc.*, 71, (10), 1988, pp. 841-844.

(List continued on next page.)

*Primary Examiner*—William R. Dixon, Jr.
*Assistant Examiner*—Sue Hollanbeck
*Attorney, Agent, or Firm*—Gary L. Griswold; Walter N. Kirn; Richard Francis

[57] ABSTRACT

The method of the present invention is useful in preparing an improved alpha alumina-based ceramic. The improvement consists of the addition of a precursor of an alpha phase nucleating to transition alumina. The method is particularly useful in preparing alpha alumina-based abrasive grain.

39 Claims, No Drawings

OTHER PUBLICATIONS

"Controlled Chemical Nucleation of Alpha Alumina Transformation", Messing et al., *Science of Ceramics* 14, Taylor, ed., 1988, pp. 101–106.

"Lowering Crystallization Temperatures by Seeding in Structurally Diphasic $Al_2O_3$–MgO Xerogels", Suwa et al., *J. Am. Ceram. Soc.*, 68, (9), 1985, pp. C238–240.

"Fine Particulates to Ultrafine-Grain Ceramics", Vasilos et al., *Ultrafine-Grain Ceramics, Proc. of 15th Sagamore Army Mat. Res.* Conf., Ch. 8, 1970, pp. 156–157.

"Study on Alumina as Raw Materials for Artificial Gems (Thermal Decomposition Process of Alums)", Okada et al., *J. Ind. Chem.*, 59 (11), 1956, pp. 1301 (71)–04 (74).

"Effect of Sintering Atmosphere on Densification of MgO-Doped $Al_2O_3$", Paek et al., *J. Am. Ceram. Soc.*, 71, (8), 1988, pp. C-380-382.

"The Effect of $Cr^{3+}$ and $Fe^{3+}$ Ions on the Transformation of Different Aluminum Hydroxides to $\alpha$-$Al_2O_3$", Tscuchida et al., *Thermochim. Acta.*, 64, 1983, pp. 337–353.

"Influence of Cr and Fe on Formation of $\alpha$-$Al_2O_3$ from $\alpha$-$Al_2O_3$", vol. 57, No. 8, 1974, pp. 367–371.

IMPREGNATION METHOD FOR TRANSFORMATION OF TRANSITION ALUMINA TO A ALPHA ALUMINA

FIELD OF THE INVENTION

This invention provides a method for preparing alpha alumina-based ceramic by impregnating transition alumina with an alpha phase nucleating material.

BACKGROUND OF THE INVENTION

The preparation of dense alumina-based ceramic articles via a sol-gel process comprising an alpha alumina or alpha ferric oxide nucleating material is known in the art. For example, M. Kumagai and G. L. Messing spoke at the American Ceramic Society meeting of May 2, 1984 on this subject and later caused the publishing of a paper in November, 1984 in *Communications of the American Ceramic Society* entitled "Enhanced Densification of Boehmite Sol-Gels by Alpha Alumina Seeding". Other references on this subject include the following publications: "Microstructural Evolution in Sintering of ALOOH Gels", by Yarbrough et al., *J. Mater. Res.*, (4), 1987, pp. 494–515; "Enhancing Densification of 93% $Al_2O_3$-7% MgO Triphasic Zerogels with Crystalline $\alpha$-$Al_2O_3$ and $MgAl_2O_4$ Seeds," Komareni et al., *J. Mater. Sci. Lett.*, 6, 1987, pp. 525–27; "Sapphire Whiskers From Boehmite Gel Seeded with from $\alpha$-Alumina, "Jagota et al., 85, 1987, pp. 527–34; "Ceramics By The Solution-Sol-Gel Route", Roy, Science, 238, Dec. 18, 1987, pp. 1664–69; "Solid-Phase Epitaxy of Boehmite-Derived from Alumina on Hematite Seed Crystals," Messing et al., *J. Am. Ceramic Soc.*, 72, (5), 1989, pp. 64–67; "Nucleation of Alpha Alumina in Boehmite Gel," Pach et al., *J. Mater. Res.*, 5, (2), Feb. 2, 1990, pp. 278–85; U.S. Pat. Nos. 4,744,802 (Schwabel), U.S. Pat. No. 4,770,671 (Monroe), U.S. Pat. No. 4,623,364 (Cottringer et al.), U.S. Pat. No. 4,829,031 (Roy et al.), and U.S. Pat. No. 4,797,139 (Bauer), and European Patent Application Nos. 0293163 (Wood), published Dec. 7, 1988; and 0294208 (Wood et al.), published Nov. 30, 1988.

Although both Monroe and Cottringer et al. disclose the use of chromium oxide as a modifying additive in a sol-gel derived alpha alumina-based ceramic, they neither suggest nor teach its use as a nucleating agent.

Although Schwabel indicates that materials crystallographically similar to alpha alumina, in addition to alpha ferric oxide, are contemplated as alpha alumina nucleating agents, he neither specifies the use of alpha chromic oxide nor teaches the use of alpha chromic oxide as a nucleating agent. He discloses the use of chromium oxide as a modifying additive, but does not suggest its use as a nucleating agent.

Several of the publications cited above suggest the use of chromium oxide ($Cr_2O_3$) as a seed or nucleating agent for the growth of alpha alumina from boehmite. None of these publications, however, disclose a method for the effective use of such a chromium-based seed or nucleating agent. For example, Bauer suggests the use of chromium oxide ($Cr_2O_3$) as a nucleating agent for the growth of alpha alumina crystals from boehmite under appropriate conditions, he fails, however, to disclose or suggest such conditions. Roy et al. attempted to use $Cr_2O_3$ as a nucleating agent and concluded that a $Cr_2O_3$ seed has "hardly any [effect]" on the alpha alumina transformation temperature, because it appears that such a seed needs to exactly match the alpha alumina lattice.

Yarbrough et al. attempted to seed an alpha alumina precursor by introducing a high purity chromia powder into a xerogel. Diffuse reflectance infrared spectra of the calcined gel suggests that the oxidation state of all or all but a small amount of the chromium was +6, not +3. Further, the authors concluded that alpha $Cr_2O_3$ does not increase nucleation frequency as much as might be expected. This article includes a photomicrograph of their best example which, reveals domains having an average diameter of about 3 micrometers. No density data were reported.

Wood et al. teach the use of an amorphous iron containing oxy-hydroxy polymer as a nucleating material for the alpha transformation in basic aluminum salt derived aluminas. Although the inventors disclose that nucleating materials prepared by the cohydrolysis of iron and chromium salts can be as effective at nucleating the alpha alumina transformation in basic aluminum salt derived alumina as the hydrous iron complex they do not teach or suggest the use of alpha chromic oxide ($Cr_2O_3$) as an alpha phase nucleating agent.

Wood teaches a method for preparing abrasive grits by a boehmite-based sol-gel process, wherein an aqueous solution comprising a precursor of a modifying additive (i.e., a metal oxide) is impregnated into the Although the inventor suggests impregnating nucleating calcined sol-gel. material into the calcined boehmite-based sol-gel, he does not suggest or teach the use of chromium-based nucleating material. Further, Patentee fails to provide any examples of seeding by impregnation of a nucleating material.

U.S. Pat. No. 3,717,497 discloses a hard, abrasion resistant refractory ceramic comprising chromium oxide, prepared by impregnating a porous, partially fired alumina structure with a chromic acid solution and heating to a temperature in the range of about 600° to 1000° C., repeating the impregnation and heating step at least 5 times, and then heating to a temperature in the range of about 1000° to 1600° C. No microstructural data were given. Patentees do not suggest or teach the use of alpha chromic oxide ($Cr_2O_3$) as an alpha phase nucleating agent.

SUMMARY OF THE INVENTION

The method of the present invention provides a convenient impregnation means of introducing nucleating material into transition alumina which is then sintered to produce a seeded alpha alumina-based ceramic. According to the invention the nucleating material is introduced by impregnation of its precursor into a transition alumina body where it is heated to convert the precursor to its nucleating phase and heating is continued to sinter the transition alumina to alpha alumina.

The term "transition alumina" as used herein means any crystallographic form of alumina which exists after heating alumina to remove any water of hydration prior to the production of alpha alumina. Examples of transition alumina include the eta, theta, delta, chi, iota, kappa, and gamma forms and any intermediate combinations of such forms. The terms "seed" and "nucleate" as used herein interchangeably refer to the providing of multiple externally introduced alpha alumina crystal growth sites. The term "domain" as used herein refers to an identifiable, generally equiaxed region comprised of alpha alumina microcrystallites or a single alpha alumina microcrystallite, wherein the lattices of the alpha alumina microcrystallites are similarly oriented.

The term "nucleating agent" as used herein refers to an externally introduced alpha phase crystal growth site. The term "nucleating material" as used herein refers to a nucleating agent or a precursor thereof.

The term "well-seeded microstructure" as used herein refers to a ceramic, which after sintering, comprises domains of less than about 1 micrometer average diameter nucleated with a nucleating agent, and having a density of greater than 95 percent of theoretical, wherein substantially all porosity is located at the microcrystallite boundaries or triple points. The term "seeded microstructure" as used herein refers to a ceramic, which after sintering, comprises domains of less than about 2 micrometers average diameter nucleated with a nucleating agent, and having a density of greater than 90 percent of theoretical, wherein substantially all porosity is located at the microcrystallite boundaries or triple points. The term "non-seeded microstructure" as used herein refers to a ceramic, which after sintering, comprises domains of greater than about 2 micrometers average diameter or a density of less than 90 percent theoretical, wherein the microstructure may be further characterized as being vermicular or wormy.

The presence of the nucleating material according to the present invention during the transformation of the transition alumina results in a ceramic material which has smaller domains and a higher density than obtained for non-seeded transition alumina producing a more durable ceramic.

The present invention provides a method of making an alpha alumina-based ceramic, comprising the steps of:

a) preparing a liquid admixture which comprises a sufficient amount of a precursor of a nucleating phase that when converted to its nucleating phase nucleates the transformation of transition alumina to alpha alumina, wherein the alpha alumina has a seeded microstructure;

b) impregnating the admixture of step (a) into a transition alumina-based body;

c) drying the impregnated transition alumina body;

d) calcining the dried impregnated transition alumina body at a temperature and in an atmosphere sufficient to substantially remove volatile materials and convert the precursor to its nucleating phase; and e) sintering the calcined-impregnated transition alumina body at a temperature and in an atmosphere sufficient to provide an alpha alumina-based ceramic having a seeded microstructure.

Preferably, the alpha alumina ceramic according to the present invention has a well-seeded microstructure. Preferably, the average diameter of the alpha alumina domains is less than about 0.5 micrometer, and most preferably their average diameter is less than about 0.25 micrometer.

The preferred liquid admixture is a molten metal salt (e.g., ferric nitrate hexahydrate, ferric nitrate momohydrate, or chromic nitrate). More preferably, the liquid admixture is aqueous.

The preferred nucleating agent is alpha chromic oxide or alpha ferric oxide. Preferably, the chromium content of the ceramic, derived from alpha chromic oxide, is in the range of about 4 to about 20 weight percent, based on the amount of alpha alumina present. More preferably, chromium is present in the range of about 5 to about 8.5 weight percent. The iron content derived from alpha ferric oxide is preferably in the range of about 4 to about 15 weight percent, based on the amount of alpha alumina present, and more preferably it is in the range of about 8.5 to about 11 weight percent.

The introduction of an alpha chromic oxide nucleating material into a transition alumina body via impregnation of a liquid admixture provides a novel method of preparing an alpha alumina-based ceramic having a seeded or well-seeded microstructure. The method according to the present invention eliminates the need for milling and classifying particulate alpha phase nucleating materials which are added to a sol comprising an alpha alumina precursor.

Particularly useful embodiments include abrasive grain (sometimes referred to as abrasive particles) and wear resistant ceramic articles, such as a thread guide, mill media, and bearings.

Abrasive grain according to the present invention exhibit increased grinding performance over a comparable ceramic without nucleating sites. Preferred abrasive products comprising the abrasive grain include coated, bonded, and low density, three-dimensional products.

Chromium-based nucleating materials useful in the present invention are disclosed in assignee's copending patent application, U.S. Ser. No. 07/552,489, filed the same date as this application.

The art neither teaches or suggests the method of the present invention for introducing a chromic oxide nucleating material into a transition alumina body.

DETAILED DESCRIPTION OF THE PREFERRED EMBODIMENT

Nucleating agents useful in preparing the ceramic of the present invention include alpha chromic oxide and alpha ferric oxide. The nucleating agent is thought to provide a growth site which aids in the formation of alpha alumina.

Preferably, an aqueous admixture is prepared by dissolving a precursor of an alpha phase nucleating agent in water. The aqueous admixture may contain a cationic or anionic chromium-based or iron-based specie. Preferably, the chromium-based or iron-based specie comprising the aqueous admixture is anionic. The aqueous admixture may comprise other ionic species, provided they do not substantially interfere with the function of the nucleating agent.

The preferred alpha phase nucleating materials are an iron-based salt such as ferric nitrate, a chromium-based salt such as chromic nitrate or $CrO_3$. The size of the nucleating material in the liquid admixture must be small enough to allow it to pass through the pores of the transition alumina during impregnation.

Preferably, the concentration of the alpha phase nucleating material in the liquid admixture is sufficient to provide the desired amount of nucleating agent after calcination. Where a single step impregnation is desired, the concentration of nucleating material in the liquid admixture should be high enough to provide, after calcination, a sufficient amount of nucleating agent to seed the alpha alumina transformation.

Preferably, the specific surface area, as determined by the BET nitrogen absorption method, of the transition alumina body is greater than about 20 $m^2/g$. More preferably, the specific surface area is in the range of about 50 to about 600 $m^2/g$, and most preferably, it is about 180 $m^2/g$.

The transition alumina body may be prepared by techniques known in the art. Preferred methods of preparing transition alumina include a dispersion-based sol-gel process, wherein, preferably, the transition alumina precursor is aluminum oxide monohydrate (boehmite) or a solution-based sol-gel process, wherein, preferably, the transition alumina precursor is an aluminum carboxylate or an aluminum nitrate.

A PREFERRED DISPERSION-BASED SOL-GEL PROCESS

A sol-gel process containing boehmite as the alpha alumina precursor usually begins with the preparation of a dispersion comprising from about 2 to almost 60 weight percent aluminum oxide monohydrate. The boehmite can either be prepared from various techniques well known in the art or can be acquired commercially from any of a number of suppliers. Boehmite is commercially available under the trade designation "DISPERAL" from Condea Chemie, GMBH or "CATAPAL D" from Vista Chemical Company. These aluminum oxide monohydrates are in the alpha-form, are relatively pure (including relatively little, if any, hydrate phases other than monohydrates), and have a high surface area. The physical properties of the final fired product will generally depend upon the type of alumina monohydrate chosen for the dispersion.

The dispersion may also contain a modifying additive or a precursor thereof which can be added to enhance some desirable property of the finished product or increase the effectiveness of the sintering step. These additives are in the form of colloidal particles or soluble salts (typically water soluble), and typically consist of a metal-containing oxide or a precursor of a metal oxide, wherein preferably the metal is selected from the group consisting of magnesium, zinc, cobalt, nickel, zirconium, hafnium, yttrium, scandium, gadolinium, silicon, lanthanum, praseodymium, cerium, dysprosium, neodynium, samarium, ytterbium, erbium, and titanium. The exact proportions of these components that are present in the dispersion can vary to convenience.

A peptizing agent is usually added to the boehmite dispersion to produce a more stable hydrosol or colloidal dispersion. Monoprotic acids or acid compounds which may be used as the peptizing agent include acetic, hydrochloric, formic, and nitric acid. The preferred peptizing agent is nitric acid. Multiprotic acids are normally avoided since they rapidly gel the dispersion making it difficult to handle or mix in additional components. Some commercial sources of boehmite contain an acid titer (such as absorbed formic or nitric acid) to assist in forming a stable dispersion.

The dispersion can be formed by any suitable means which may simply be the mixing of aluminum oxide monohydrate with water containing a peptizing agent or by forming an aluminum oxide monohydrate slurry to which the peptizing acid is added. Once the dispersion is formed, it preferably is then gelled. The gel can be formed by any conventional technique such as the addition of a dissolved or dispersed metal containing modifying additive, e.g., magnesium nitrate or zirconium nitrate, the addition of a salt such as ammonium acetate or ammonium nitrate, the removal of water from the dispersion, or some combination of such techniques.

Once the gel has formed, it may be shaped by any convenient method such as pressing, molding or extrusion and then carefully dried to produce an uncracked body of the desired shape.

If an abrasive material is desired, the gel can be extruded or simply spread out to any convenient shape and dried, typically at a temperature below the frothing temperature of the gel. Any of several dewatering methods, including solvent extraction, can be used to remove the free water of the gel to form a solid. Preferably, the gel is dried by heating in a conventional forced air convection oven with an air temperature between about 70° and about 99° C.

After the solid is dried, it can be cut or machined to form a desired shape or crushed or broken by an suitable means, such as a hammer, roll crusher, or ball mill, to form particles. Any method for comminuting the solid can be used and the term "crushing" is used, to include all such methods.

After shaping, the dried gel can then be calcined to remove essentially all volatiles and transform the various components of the dried gel into ceramics (metal oxides). Preferably, the dried gel is calcined by heating to a temperature in the range of about 400° to about 1000° C. and held within this temperature range until the free water and over 90 weight percent of any bound water is removed. Generally it is preferred that the calcined material have a high surface area.

Other steps can be included in this process, such as rapidly heating the material from the calcining temperature to the sintering temperature, sizing granular material, centrifuging the dispersion to remove sludge waste, etc. Moreover, this process can be modified by combining two or more of the individually described steps, if desired.

These process steps and materials are more fully described in U.S. Pat. Nos. 4,314,827 and 4,744,802, the disclosures of which are incorporated herein by reference.

A PREFERRED SOLUTION-BASED SOL-GEL PROCESS

A solution-based sol can be prepared by techniques known in the art. Typical preparation techniques include dissolving an aluminum-based salt or complex in water; or diluting or concentrating a solution comprising an aluminum-based salt or complex. Preferably, the solution-based sol comprises in the range of about 5 to about 45 weight percent of an alpha alumina precursor. Preferably, the solution-based sol-gel comprises a soluble aluminum salt or other soluble aluminum-based complex. More preferably, the solution-based sol-gel comprises at least one of the following alpha alumina precursors: a basic aluminum carboxylate, a basic aluminum nitrate, and a partially hydrolyzed aluminum alkoxide.

Preferred solution-based sols include those comprising basic aluminum salts with carboxylate or nitrate counterions or mixtures thereof.

Preferred aluminum carboxylates are represented by the general formula, $$Al(OH)_y D_{3-y},$$

wherein y can range from between about 1 and about 2, preferably between about 1 and about 1.5, and D (the carboxylate counterion) is formate, acetate, propionate, oxalate, the like, and combinations thereof. Aluminum carboxylates can be prepared by techniques known in the art including the methods described in U.S. Pat. No.

3,957,598 (the disclosure of which is incorporated herein by reference), wherein aluminum metal is digested in a carboxylic acid solution and U.S. Pat. No. 4,798,814 (the disclosure of which is incorporated herein by reference), wherein aluminum metal is dissolved in a hot aqueous solution comprising formic acid and acetic acid.

Preferred basic aluminum nitrates are represented by the general formula,

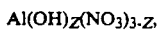

$Al(OH)_Z(NO_3)_{3-Z}$, wherein Z is in the range of about 0.5 to about 2.5. The preparation of basic aluminum nitrates is known in the art and includes the methods taught in U.S. Pat. No. 3,340,205 and British Patent No. 1,139,258 (the disclosures of which are incorporated herein by reference), wherein aluminum metal is digested in a nitric acid solution. Basic aluminum nitrates may also be prepared according to U.S. Patent No. 2,127,504 (the disclosure of which is incorporated herein by reference), wherein aluminum nitrate is thermally decomposed.

Modifying additives as described in the preferred dispersion-based sol-gel process may be added to the solution-based sol.

The solution-based sol may be immobilized (or rigidified) by any conventional technique including dehydrative rigidification. The immobilized sol may be dried by known techniques including those described above for drying a gelled dispersion-based sol.

An abrasive material or other shaped article may be prepared as described above in the preferred dispersion-based sol gel process.

The process steps for preparing other preferred embodiments (i.e., a bead, a microsphere, a flake, an irregularly shaped particle, a film, or a microcapsule) are described in European Patent Application No. 0294208, published Dec. 7, 1988, the disclosure of which is incorporated herein by reference.

The dried solution may be calcined as described above in the preferred dispersion-based sol-gel process.

Other steps can be included in this process, such as sizing granular material, centrifuging the dispersion to remove sludge waste, etc. Moreover, this process can be modified by combining two or more of the individually described steps, if desired.

It is within the scope of this invention to prepare a transition alumina-based body by making a transition alumina-based powder according to a sol-gel method described above or by other techniques known in the art including, for example, calcining alumina trihydrate, conventionally forming the powder into a shaped, green article, and then calcining. Such conventional forming techniques are known in the art and include, for example, dry pressing, slip casting, tape casting, etc.

A PREFERRED IMPREGNATION METHOD

A liquid admixture according to the present invention may be impregnated into a transition alumina body using impregnation techniques known in the art, including, for example, allowing a liquid to wick into a porous body, forcing a liquid into a porous body by the application of pressure, or using an aspirator to pull a partial vacuum to allow air trapped within the porosity of a body to escape, and a liquid to more infiltrate the porosity.

Impregnation of the transition alumina may be accomplished in a single impregnation (i.e., using only one impregnation liquid a single time) or it may be accomplished in several impregnation steps (i.e., the single impregnation step may be repeated). Preferably, the number of impregnation steps is not greater than 3. The precursor and concentration thereof may be the same or different for each impregnation. The impregnation liquid may, if desired, comprise of more than one alpha phase nucleating material.

Between each impregnation step, excess liquid may be removed, if necessary, by filtering or centrifuging, and the impregnated material is then dried and calcined, as described in the preferred dispersion-based sol-gel process above, to remove volatile species introduced during impregnation, except that the calcination atmosphere depends on the nucleating agent chosen. The atmosphere should be such that the impregnated precursor convert to its nucleating phase during calcining. For example, if the nucleating material is an alpha ferric oxide precursor the preferred calcining atmosphere is oxidizing. More preferably, the calcining atmosphere is air.

If the nucleating material is $CrO_3$ the preferred calcining atmosphere comprises air. More preferably, the calcining atmosphere comprises a mixture of air and an inert gas (i.e., argon, nitrogen, helium, carbon dioxide, the like, or mixtures thereof). Even more preferably, the calcining atmosphere comprises an inert gas. Still more preferably, the calcining atmosphere comprises a mixture of an inert gas and a reducing gas (i.e., hydrogen, carbon monoxide, the like, or mixtures thereof), and most preferably it comprises a reducing gas.

If the nucleating material is chromic nitrate the preferred calcining atmosphere comprises an inert gas. More preferably, the calcining atmosphere comprises a mixture of an inert gas and a reducing gas. Most preferably, the calcining atmosphere comprises a reducing gas.

After the final impregnation and calcining steps the material is sintered by heating to a temperature sufficient to provide an alpha alumina-based ceramic having a seeded or well-seeded microstructure.

Preferably, the sintering temperature is in the range of about 1200° to about 1650° C. More preferably, the sintering temperature is in the range of about 1300° to about 1450° C., and most preferably about 1350° to about 1450° C.

The preferred sintering atmosphere is dependent on the nucleating material. For a chromium-based nucleating material, the sintering atmosphere should be such that substantially all the chromium comprising the nucleating material is in an oxidation state of not greater than +3. It is believed, although not confirmed, that having a relatively small amount of chromium in the +2 oxidation state may enhance the sintering process.

Preferably, the sintering atmosphere comprises a gas selected from the group consisting of air, inert gas, reducing gas, and compatible mixtures thereof.

For an iron-based nucleating material the preferred sintering atmosphere is oxidizing. The most preferred sintering atmosphere is air.

Optionally, the calcined material may be rapidly heated from the calcining temperature to the sintering temperature.

The sintered ceramic may be coated with a powder or powder-like coating. In applications requiring good adhesion to a ceramic according to the present invention, it is preferably that this coating be removed. Such a coating may be removed by techniques known to one skilled in the art including washing with water, sand milling, vibro milling, the like, and combinations thereof.

It is within the scope of this invention to use a transition alumina body comprising nucleating agents or precursors thereof known in the art which have been introduced prior to impregnating according to the present invention, provided such nucleating agents are not added in a sufficient amount to provide an alpha alumina-based ceramic having a seeded or well seeded microstructure, in the absence of the impregnated nucleating agent according to the present invention.

It is also within the scope of this invention to add the modifying additives described above using an impregnation process.

The steps of impregnating a transitional alumina are more fully described in European Patent Application No. 0293163, the disclosure of which is incorporated herein by reference.

Preferably, the total amount of alumina, iron oxide, and chromium oxide present in the alpha alumina-based ceramic of the present invention is at least 60 weight percent, based on the total ceramic composition. More preferably, the amount of alumina, iron oxide, and chromium oxide present is at least 80 weight percent, and most preferably, alumina, iron oxide, and chromium oxide comprise at least 90 weight percent of the ceramic composition.

The improved ceramic may be substantially void free or it may be characterized by including porosity. Typically equaxial pores which are for the most part on the interior of the ceramic with a minor part of the pores extending to the surface. Preferably, however, the porosity is closed.

Preferably, the improved ceramic has a hardness greater than 18 GPa. More preferably, the hardness is greater than 22 GPa, and most preferably, greater than 25 GPa.

The ceramic of the present invention may be used in areas where conventional ceramics are used and particularly where a more durable ceramic is needed. Particularly useful embodiments include articles in the shape of an abrasive particle, a bead, a microsphere, a flake, an irregularly shaped particle, a microcapsule, a thread guide, a bearing, or mill media.

Methods of making abrasive products are well-known to those skilled in the art. A coated abrasive product includes a backing, for example, formed of fabric (e.g., woven or non-woven fabric such as paper) which may be saturated with a filled binder material, a polymer film such as that formed of oriented heat-set polypropylene or polyethylene terephthalate which may be first primed, if needed, with a priming material, or any other conventional backing material. The coated abrasive also includes a binder material, typically in layers including a make or maker coat, a size or sizing coat and possibly a supersize coat. Conventional binder materials include phenolic resins.

Low-density, three-dimensional, non-woven abrasive products typically include an open porous lofty polymer filament structure having the ceramic abrasive grain distributed throughout the structure and adherently bonded therein by an adhesive material.

Bonded abrasive products typically consist of a shaped mass of abrasive grain held together by an organic or ceramic binder material. The shaped mass is preferably in the form of a grinding wheel. The preferred binder materials for the ceramic abrasive grain of the invention are organic binders. Ceramic or vitrified binders may be used if they are curable at temperatures and under conditions which will not adversely affect the ceramic abrasive grain of the present invention.

It is without scope of the present invention to blend abrasive grain according to the present invention with less expensive conventional mineral such as fused aluminum oxide, silicon carbide, garnet, fused alumina-zirconia, and the like.

This invention is further illustrated by the following examples, but the particular materials and amounts thereof recited in these examples, as well as other conditions and details, should not be construed to unduly limit this invention. All parts and percentages are by weight unless otherwise indicated.

EXAMPLES

Control

The Control Example illustrates an alpha alumina-based ceramic having a non-seeded microstructure.

Particles having a size of $-24+50$ mesh (i.e., about 300 to about 735 micrometers) were prepared according to the general procedure as described in Examples 1–32 of European Patent Application No. 0293163, the disclosure of which is incorporated herein by reference. The (calcined) particles were porous such that 500 grams of the calcined material was capable of absorbing 225 ml of deionized water.

The crushed, calcined material was identified by conventional x-ray diffraction techniques as transition alumina.

The calcined material was sintered in a conventional box furnace (Rapid-Temp Furnace; CM, Inc.; Bloomingfield, N.J.) in air for 5 minutes at a temperature of 1400° C.

Several pieces of the sintered ceramic were crushed using a tungsten carbide mortar and pestle. Optical microscopy of the crushed ceramic at a magnification of 500X using cross polarized light indicated domains having a diameter of about 5 to about 12 micrometers. The average diameter of the domains was about 6 to about 8 micrometers.

EXAMPLE 1

A chromic acid solution was prepared by dissolving 41.6 grams of $CrO_3$ (J. T. Baker; Phillisburg, N.J.) in 67.5 grams of deionized water. About 200 grams of the chromic acid solution were added to a glass beaker charged with 200 grams of the calcined material described in the Control Example. The contents of the beaker was gently mixed with a spatula.

The resulting impregnated material was dried in a forced air convection oven for 15 hours at 95° C. The material was then calcined in a tube furnace in air by heating it to 650° C. in 1 hour, and then holding the material at this temperature for 1 hour. About 5 grams of this re-calcined material was sintered as described in the Control Example to provide Sample 1.

Optical microscopy of the Sample 1 ceramic, as described in the Control Example, revealed that portions of the ceramic had domains having diameters of less than about 3 micrometers.

Sample 2 was prepared by re-impregnated about 200 grams of the re-calcined-impregnated material, described above, with a chromic acid solution prepared by dissolving 41.6 grams of $CrO_3$ in 50 grams of deionized water This re-impregnation did not completely saturate the Sample 1 material. The reimpregnated Sample 1 material was impregnated again with a chromic acid solution prepared by dissolving 25 grams of $CrO_3$ in 20 grams of deionized water. The material was then dried, calcined, and sintered as described in the preparation of Sample 1 to to provide Sample 2. The appearance of the sintered particles of Sample 2 were very dark red.

SEM examination of fracture surfaces of Sample 2 revealed a uniform microstructure comprised domains having a diameter of about 0.4 to about 0.7 micrometer. The density of the ceramic, however, was not uniform. Some pieces of the ceramic had a density in the range of about 95 to 99 percent of theoretical, while others had a density less than about 95 percent of theoretical.

to grind the face of 1.25 cm × 18 cm 1018 cold rolled steel workpiece. The disc was driven at 5000 rpm while the portion of the disc overlying the beveled edge of the back-up pad contacted the workpiece at a pressure of 0.91 kg/cm², generated a disc wear path of about 140 cm². Each disc was used to grind 12 separate workpieces for 1 minute each.

Using the average cumulative cut of 3 discs made using brown fused alumina abrasive grain as 100%, the average relative cumulative cut of the 12 cuts for 1 disc having the abrasive grain of Example 2 was 188%.

Microstructural data for each Example is summarized in Table 1, below.

TABLE 1

| Example No. | Nucleating material | Calcining temperature, °C.* | Calcining atmosphere* | Sintering temperature °C. | Sintering atmosphere | Average diameter of alpha alumina grains, micrometers | Percent theoretical density, % |
|---|---|---|---|---|---|---|---|
| 1, Sample 1 | $CrO_3$ | 650 | air | 1400 | air | <3 | — |
| 1, Sample 2 | $CrO_3$ | 650 | air | 1400 | air | 0.4–0.7 | up to 99 |
| 2 | $CrO_3$ | 600 | air | 1400 | air | 0.4–0.7 | up to 99 |
| Control | — | — | — | 1400 | air | 6–8 | — |

*after impregnation

EXAMPLE 2

Example 2 was prepared in the same manner as Sample 1 of Example 1, except the chromic acid solution was prepared by dissolving 100 grams of $CrO_3$ in a sufficient amount of deionized water to provide a total volume of 90 ml and the impregnated material was calcined by heating it to 600° C. in 1 hour.

SEM examination, as described in Example 1, revealed the microstructure was more uniform and slightly denser than the Sample 1 of Example 1.

The hardness of 4 Example 2 particles were determined by a standard Knoop hardness technique (Leitz Miniload 2; Ernst Leitz Wetzlar GMBH; West Germany) where the applied load was 500 grams. The average hardness of 2-5 indents per particle ranged from 19 to 30 GPa.

The resulting ceramic of Example 2 was used as abrasive grain to make a 17.75 cm (7-inch) diameter coated abrasive disc having a 2.2 cm (⅞ inch) centerhole. The abrasive grain for the disc consisted of a 1:1 by weight mixture of −30+35 mesh (average diameter of about 550 micrometers) and −35+40 mesh (average diameter of about 460 micrometers) screen cuts obtained using U.S. Standard Screens.

The disc was prepared using conventional coated abrasive making procedures, conventional 0.76 mm vulcanized fiber backings and conventional calcium carbonate-filled phenolic make and size resins, without adjusting for mineral density differences. The make resin was precured for 75 minutes at 88° C. The size resin was precured for 90 minutes at 88° C. followed by a final cure of 100° C. for 10 hours. Conventional one-trip coating techniques and curing in a forced air oven were employed. The coating weights (wet basis) were as follows:

| Coating | Coating Weight (g/cm²) |
|---|---|
| make | 0.017 |
| size | 0.052 |
| mineral | 0.073 |

The resultant cured disc was first conventionally flexed to controllably crack the hard bonding resins, mounted on a beveled aluminum back-up pad, and used Various modifications and alterations of this invention will become apparent to those skilled in the art without departing from the scope and spirit of this invention, and it should be understood that this invention is not to be unduly limited to the illustrative embodiments set forth herein.

I claim:

1. A method of making an alpha alumina-based ceramic, having a seeded microstructure comprising alpha alumina domains nucleated with an alpha chromic oxide nucleating agent, said method comprising the steps of:
    a) preparing a liquid admixture which comprises a sufficient amount of a precursor of alpha chromic oxide that when converted to alpha chromic oxide nucleates the transformation of transition alumina to alpha alumina, wherein said alpha alumina has a seeded microstructure;
    b) impregnating said admixture of step (a) into a transition alumina-based body;
    c) drying said impregnated transition alumina body;
    d) calcining said dried impregnated transition alumina body at a temperature an in an atmosphere sufficient to substantially remove volatile materials and convert said precursor to its nucleating phase; and
    e) sintering said calcined-impregnated transition alumina body at a temperature and in an atmosphere sufficient to provide an alpha alumina-based ceramic having a seeded microstructure comprising alpha alumina domains nucleated with alpha chromic oxide.

2. The method according to claim 1 wherein said alpha alumina ceramic has a well-seeded microstructure.

3. The method according to claim 1 wherein said liquid admixture is a molten metal salt.

4. The metal according to claim 1 wherein said liquid admixture is aqueous.

5. The method according to claim 1 wherein said precursor of a nucleating phase is a chromium-based salt.

6. The method according to claim 1 wherein said chromium-based salt is chromium nitrate.

7. The method according to claim 5 wherein said precursor of a nucleating phase is $CrO_3$.

8. The method according to claim 1 wherein said admixture contains more than one precursor of an alpha alumina precursor.

9. The method according to claim 1 wherein steps (b), (c), and (d) are repeated in sequence up to 3 times.

10. The method according to claim 1 wherein said alpha alumina-based ceramic comprises in the range of about 4 to about 20 weight percent chromium, derived from alpha chromic oxide, based on the amount of alpha alumina present.

11. The method according to claim 1 wherein said alpha alumina-based ceramic comprises in the range of about 5 to about 8.5 weight percent chromium, derived from alpha chromic oxide, based on the amount of alpha alumina present.

12. The method according to claim 1 wherein said transition alumina contains at least one modifying additive.

13. The method according to claim 12 wherein said modifying additive is a metal-containing compound.

14. The method according to claims 1, 12 or 13, wherein the total quantity of alumina, and chromium oxide present in said alpha alumina-based ceramic is at least 60 weight percent, based on the total ceramic composition.

15. The method according to claims 1, 12 or 13, wherein the total quantity of alumina, and chromium oxide present in said alpha alumina-based ceramic is at least 90 weight percent, based on the total ceramic composition.

16. The method of claim 1 wherein the composition of said admixture is the same for each impregnation.

17. The method of claim 1 wherein the composition of said admixture is different for each impregnation.

18. The method according to claim 1 wherein said transition alumina body is prepared by a dispersion-based sol-gel process, said process comprising the steps of:
   a) preparing a dispersion-based sol comprising a transition alumina precursor;
   b) gelling said sol;
   c) drying said gelled sol to produce a dry body; and
   d) calcining said body, wherein substantially all volatile materials are removed, to provide a transition alumina-based body.

19. The method according to claim 18 wherein said transition alumina precursor is boehmite.

20. The method according to claim 1 wherein said transition alumina body is prepared by a solution-based sol-gel process, said process comprising the steps of:
   a) preparing a solution-based sol comprising an transition alumina precursor;
   b) rigidifying said sol;
   c) drying said sol to produce a dry body; and
   d) calcining said body, wherein substantially all volatile materials are removed, to provide a transition alumina-based body.

21. The method according to claim 20 wherein said transition alumina precursor is a basic aluminum carboxylate.

22. The method according to claim 20 wherein said transition alumina precursor is a basic aluminum nitrate.

23. The method according to claim 18 or 20 wherein said dried body is crushed before calcining to produce particles.

24. The method according to claim 18 or 20 wherein said calcined body is crushed to produce particles.

25. The method according to claim 1 wherein said calcined-impregnated body is crushed to produce particles.

26. The method according to claim 1, 18 or 20 wherein said calcining temperature is in the range of about 400° to about 1000° C.

27. The method according to claim 1, 3, or 7 wherein said calcining atmosphere is air.

28. The method according to claim 1, 6, or 7 wherein said calcining atmosphere comprises an inert gas.

29. The method according to claim 1, 6, or 7 wherein said calcining atmosphere comprises an inert gas and a reducing gas.

30. The method according to claim 1, 6, or 7 wherein said calcining atmosphere comprises a reducing gas.

31. The method according to claim 1 wherein said sintering temperature is in the range of about 1200° to about 1650° C.

32. The method according to claim 1 wherein said sintering temperature is in the range of about 1300° to about 1450° C.

33. The method according to claim 1 wherein said sintering temperature is in the range of about 1350° to about 1450° C.

34. The method according to claim 7 wherein said sintering atmosphere comprises air.

35. The method according to claim 5, 6, or 7 wherein said sintering atmosphere comprises air and an inert gas.

36. The method according to claim 5, 6, or 7 wherein said sintering atmosphere comprises an inert gas.

37. The method according to claim 5, 6, or 7 wherein said sintering atmosphere comprises an inert gas and a reducing gas.

38. The method according to claim 5, 6, or 7 wherein said sintering atmosphere comprises a reducing gas.

39. The method according to claim 1 further comprising step of forming said alumina-based ceramic body as an abrasive grain, a bead, a microsphere, an irregularly shaped particle, a flake, or a microcapsule.

* * * * *

UNITED STATES PATENT AND TRADEMARK OFFICE
CERTIFICATE OF CORRECTION

PATENT NO. : 5,139,978
DATED : August 18, 1992
INVENTOR(S) : Thomas E. Wood

It is certified that error appears in the above-indentified patent and that said Letters Patent is hereby corrected as shown below:

Title page, item [54], line 3, and col. 1, line 3, "TO A ALPHA" should read --TO ALPHA--.

Title page, item [56], under OTHER PUBLICATIONS, col. 1, line 3 and 4 should read --Crystalline + Amorphous)--.

Column 1, line 25, "Zerogels" should read --Xerogels--.

Column 1, line 28, "with from" should read --with--.

Column 1, line 29, "Alumina, "Jagota" should read --Alumina," Jagota--.

Column 2, line 11, "which," should read --which--.

Column 2, line 27, "into the" should read --into the calcined sol-gel.--.

Column 2, lines 28-29, "nucleating calcined sol-gel. material" should read --nucleating material--.

Column 2, line 31-32, "Patentee" should read --patentee--.

Column 6, lines 13-14, "an suitable" should read --any suitable--.

UNITED STATES PATENT AND TRADEMARK OFFICE
CERTIFICATE OF CORRECTION

PATENT NO. : 5,139,978
DATED : August 18, 1992
INVENTOR(S) : Thomas E. Wood

It is certified that error appears in the above-indentified patent and that said Letters Patent is hereby corrected as shown below:

Column 8, line 66, "preferably" should read --preferable--.

Column 10, line 4, "without" should read --within the--.

Column 10, line 63, "re-impregnated" should read --reimpregnating--.

Column 10, line 67, "water  This" should read --water. This--.

Column 11, line 5, "to to" should read --to--.

Column 11, line 34, "4" should read --four--.

Column 12, line 46, "an in" should read --and in--.

Signed and Sealed this

Seventh Day of June, 1994

Attest:

BRUCE LEHMAN

Attesting Officer

Commissioner of Patents and Trademarks